United States Patent
Cromarty et al.

(10) Patent No.: US 6,393,442 B1
(45) Date of Patent: May 21, 2002

(54) DOCUMENT FORMAT TRANSFORATIONS FOR CONVERTING PLURALITY OF DOCUMENTS WHICH ARE CONSISTENT WITH EACH OTHER

(75) Inventors: Valerie Christensen Cromarty; Joni Lee Gordon, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/074,784

(22) Filed: May 8, 1998

(51) Int. Cl.[7] ................................................ G06F 3/00
(52) U.S. Cl. ..................... 707/523; 707/513; 707/501.1
(58) Field of Search .................................. 707/523, 513, 707/205, 501, 511

(56) References Cited

U.S. PATENT DOCUMENTS

| | | | |
|---|---|---|---|
| 5,299,304 A | 3/1994 | Williams et al. ............. | 395/148 |
| 5,353,388 A | 10/1994 | Motoyama ................... | 395/117 |
| 5,513,323 A | 4/1996 | Williams et al. ........ | 395/200.18 |
| 5,530,852 A | 6/1996 | Meske, Jr. et al. .......... | 395/600 |
| 5,629,846 A | 5/1997 | Crapo ......................... | 395/785 |
| 5,644,776 A | 7/1997 | DeRose et al. ............. | 395/761 |
| 5,649,218 A | 7/1997 | Saito .......................... | 395/774 |
| 5,655,130 A * | 8/1997 | Dodge et al. ............... | 707/511 |
| 5,781,914 A * | 7/1998 | Stork et al. ................. | 707/506 |
| 5,889,942 A * | 3/1999 | Orenshteyn ................. | 713/201 |
| 5,911,776 A * | 6/1999 | Guck ......................... | 707/205 |
| 5,915,259 A * | 6/1999 | Murata ....................... | 707/513 |
| 6,085,203 A * | 7/2000 | Ahlers et al. ............... | 707/523 |

OTHER PUBLICATIONS

Input/Output Processor that Implements Compact HEX to EBDIC Conversion Algorithm, IBM TBD, 11/93, vol. 36, iss.# 11, p. 341–342.*

OS/2 EE Database Manager SQLJRA Remote Protocol, IBM TBD, 1/93, vol. 36, iss.# 1, p. 33–36.*

Garrison, N, Publishing a Document Set Simultaneously on Paper, CD–ROM, and the Web, IEEE, 5/96.*

* cited by examiner

*Primary Examiner*—Stephen S. Hong
*Assistant Examiner*—Cesar B. Paula
(74) *Attorney, Agent, or Firm*—Sawyer Law Group LLP; Ingrid M. Foerster

(57) ABSTRACT

The present invention provides a method and system for converting a source document into a plurality of documents, each of the plurality of documents having one of a plurality of formats. The method and system comprise providing a document type definition for formatting the source document. The method and system further comprise providing a transform to convert the source document into the plurality of documents. At least one of the plurality of documents has a binary code format. The method and system enable production of the plurality of documents, each representing a version of the source document, such that the versions are consistent with each other.

28 Claims, 4 Drawing Sheets

DOCUMENT FORMAT TRANSFORATIONS FOR CONVERTING PLURALITY OF DOCUMENTS WHICH ARE CONSISTENT WITH EACH OTHER

FIELD OF THE INVENTION

The present invention relates generally to document formatting and more particularly to producing a plurality of documents from a common document.

BACKGROUND OF THE INVENTION

In a network environment, such as the Internet, servers are accessible to clients via Uniform Resource Locators (URL's). Client programs and a servers communicate using the functionality provided by Hypertext Transfer Protocol (HTTP).

Typically, servers execute server software which presents information to the clients in the form of HTTP responses corresponding to World Wide Web pages ("Web pages"). Web pages are represented using for example Hypertext Markup Language (HTML). HTML files, displayed as Web pages on the client's console, are created from source document files provided in a Standard Generalized Markup Language (SGML) format or in any other text description/ formatting markup language format used for document generation. An SGML formatted source document file may be transformed into an HTML formatted file using for example OmniMark®, an industry standard SGML to HTML transform.

Document generation uses, for instance, SGML, as a form of markup for specifying the presentation of a particular segment of text in the document. SGML is a structural markup language for describing the structure and content of a document and, particularly, the information stored in each segment of the document. SGML tags are embedded in the document such that each of the segments is clearly defined. A beginning tag and end tag which is preceded by a slash (/) character distinguishes each of the segments, wherein each tag is enclosed in less then greater than symbols (<>).

In a typical SGML implementation, a Document Type Definition (DTD), such as the Information Development Document, IDDOC®, produced by IBM Corporation, sets forth rules for managing a hierarchical relationship between the various document segments and for naming each of the SGML tags, giving the tags names such as paragraph, title, heading, date, brief, etc. For example, a title originally represented as "A Guide to Understanding SGML," will be formatted using SGML tags to produce: "<title> A Guide to Understanding SGML </title>." One aspect of the structural markup languages such as the SGML is the fact that an original formatted document can be used to produce a plurality of document versions thereof, each constituting an assembly of formatted version-specific segments of the original document.

In general, when a conventional application program is executed, error conditions or other operation related events occur. These error conditions and events are flagged using messages to alert the user of their existence. One of the key issues is providing helpful and accurate message identifiers, text and related information such as action items. When more than one source provides the messages and/or related information, as when the messages are produced electronically and in a printed reference manual, there can be inconsistency between the sources.

For instance, in a conventional digital library system, server programs produce system messages during execution and communications with client programs. The system messages include error messages, warning messages, information messages and action messages. The system messages are accessible electronically, as when they are provided on-screen, and they can be further interpreted by the user via an on-line help Web page ("on-line help") or, alternatively, via a printed reference manual book ("book") provided by the manufacturer. On-screen, each of the system messages typically includes a message identifier and message contents. The on-line help and the book typically contain information related to the messages which can be indexed by the message identifiers. The on-line help may be represented using the above-mentioned HTML. The system messages are created and maintained by programmers. On the other hand, technical writers create and maintain the book and the on-line help.

A problem arises when the on-line help and the book are inconsistent with each other and, further, with the system messages. For example, a message identifier may point to information in the on-line help and/or the book that is inconsistent with the system message identified thereby. This problem can be compounded when several versions of the server programs are produced and maintained for different operating systems. For example, server programs may include messages having source text versions directed to AIX®, OS/2®, WINDOWS NT®, UNIX®, etc.

This problem is dealt with partially by a conventional method disclosed in Dodge et al. ("Dodge"), U.S. Pat. No. 5,655,130. The method in Dodge allows technical writers to produce, one at a time, a particular version of a document from a single source document containing all the desired versions, The source document is initially constructed using SGML wherein the particular version of the source document is produced by filtering out all the other versions and leaving in only the particular version.

However, in conventional methods, including the Dodge method, the messages prompted by the application programs are produced separately from any one of the particular versions of the source document. Therefore, conventional methods do not solve the problem of maintaining consistency between the on-screen system messages and on-line-help and printed document, i.e., the book. As a result, the on-line help and the book may be also inconsistent with each other.

Accordingly, what is needed is a system and method for producing multiple versions from a common document such that the versions are consistent with each other and such that consistency with the system messages is provided. The present invention addresses such needs.

SUMMARY OF THE INVENTION

The present invention provides a method and system for converting a source document into a plurality of documents, each of the plurality of documents having one of a plurality of formats. The method and system comprise providing a document type definition (DTD) for formatting the source document. The method and system further comprise providing a transform to convert the source document into the plurality of documents. At least one of the plurality of documents is a file having a binary code format.

A method and system in accordance with the present invention enables production of the plurality of documents, each representing a version of the source document, such that the versions are consistent with each other. In addition, with the binary code formatted version, used as a source for the system messages, consistency of the system messages with the other versions of the source document is attained.

DETAILED DESCRIPTION OF THE INVENTION

The present invention relates generally to document formatting and more particularly to producing a plurality of documents from a common document.

The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention is implemented to achieve consistency between a plurality of documents, each having a format and each representing a version of a common source document. In accordance with the present invention, unlike conventional methods, at least one of the versions comprises a binary code format such that with the binary code formatted version, which is used as a source for system messages, consistency of the system messages with the other versions of the source document is attained.

Figure 1:
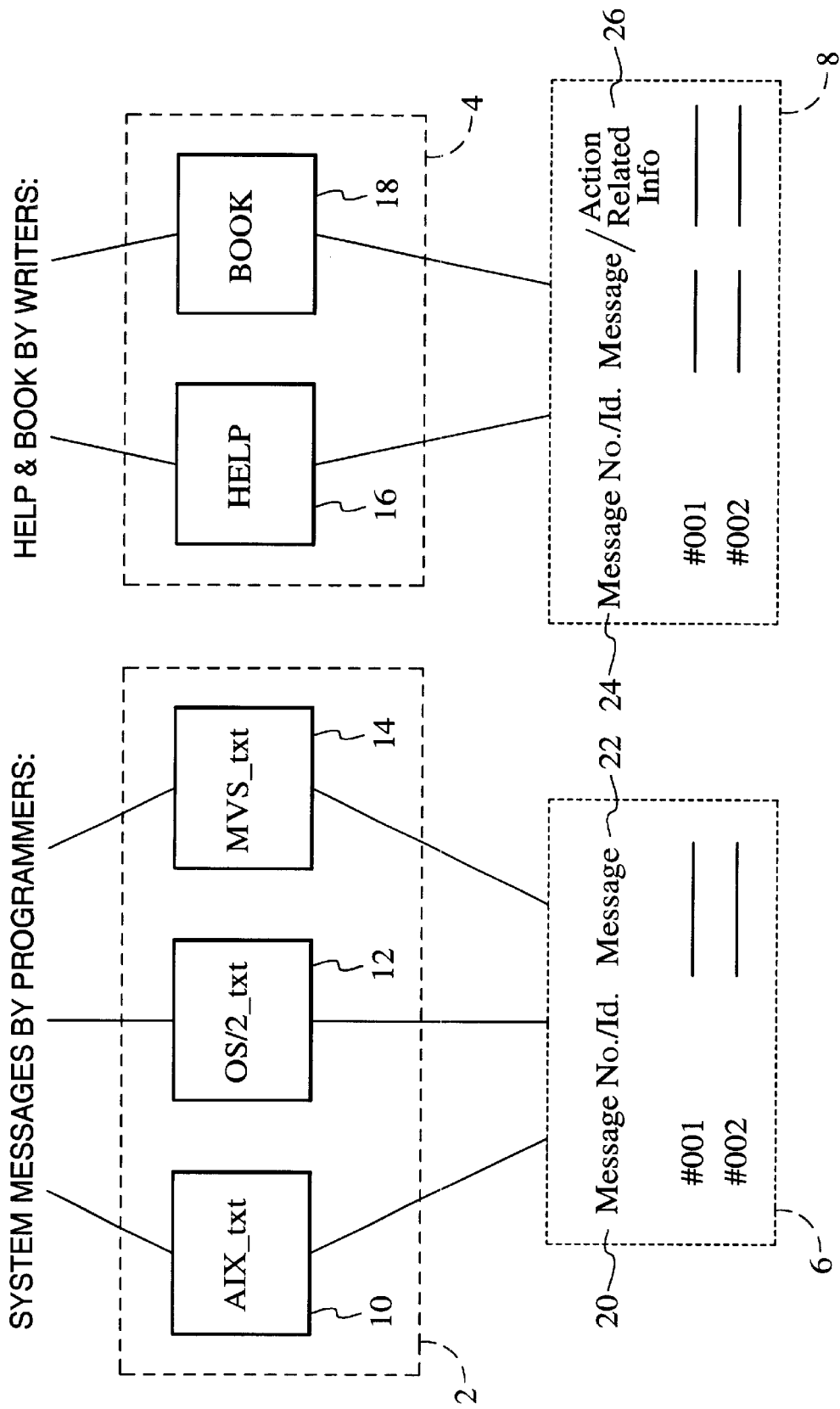
FIG. 1 illustrates a conventional approach to providing a plurality of documents, each representing a version of a source document.

A conventional method for providing a plurality of documents, each representing an independent version of the system messages and the related information, is illustrated in FIG. 1. Inconsistency between the plurality of documents is readily apparent in this approach. On one hand, the system messages, created and maintained by programmers, are produced in system messages text files 2 ("text files"). Each of the text files 2 is operating system platform dependent. For example, if the operating system platform is one of AIX®, OS/2® and MVS®, then a corresponding text file is one of, AIX_txt 10, OS/2_txt 12 and MVS_txt 14, respectively. On the other hand, the system messages and/or related information, created and maintained by technical writers as help and book versions 4 thereof, are produced electronically in an on-line help World Wide Web page ("Web page") from a help file 16, and are further produced in a printed copy from a book file 18.

Each of the system messages 6 in the text files 2 typically comprises a message identifier 20 (e.g., #001, #002, etc.) and message text 22. Each of the system messages and/or the related information in the help and book versions 4 typically comprises a message identifier 24 and message text and/or related information 26 such as an action item. The message identifier 20 in the text files 2 and the message identifier 24 in the help and book versions 4 are typically identical and point to the message text 22 and the corresponding message text and/or related information 2, respectively. Yet, the message text and/or related information 26 may be inconsistent with the message text 22. This inconsistency results from the text files 2 and the help and book versions 4 not necessarily being produced from a common source and by the same individuals. Compounding this problem is the plurality of operating system platform based versions of the text files 10, 12 and 14. In contrast, the present invention addresses the need to maintain the consistency between the plurality of documents. In accordance with the present invention, each of the plurality of documents has a format, at least one of which is the binary code format, and each of them represents a version of a source document.

The present invention is implemented in a computer or a computer network. In the preferred embodiment the present invention is implemented in a computer network, wherein client programs, also known as application programs, are not server-resident. Client programs are preferably external to the server so that they can operate on small size systems (e.g., personal computers, workstations, etc.). One of ordinary skill in the art will recognize that any client-server configuration may be used to implement the present invention, including a configuration wherein the client programs are resident in any computer including the server.

Figure 2:
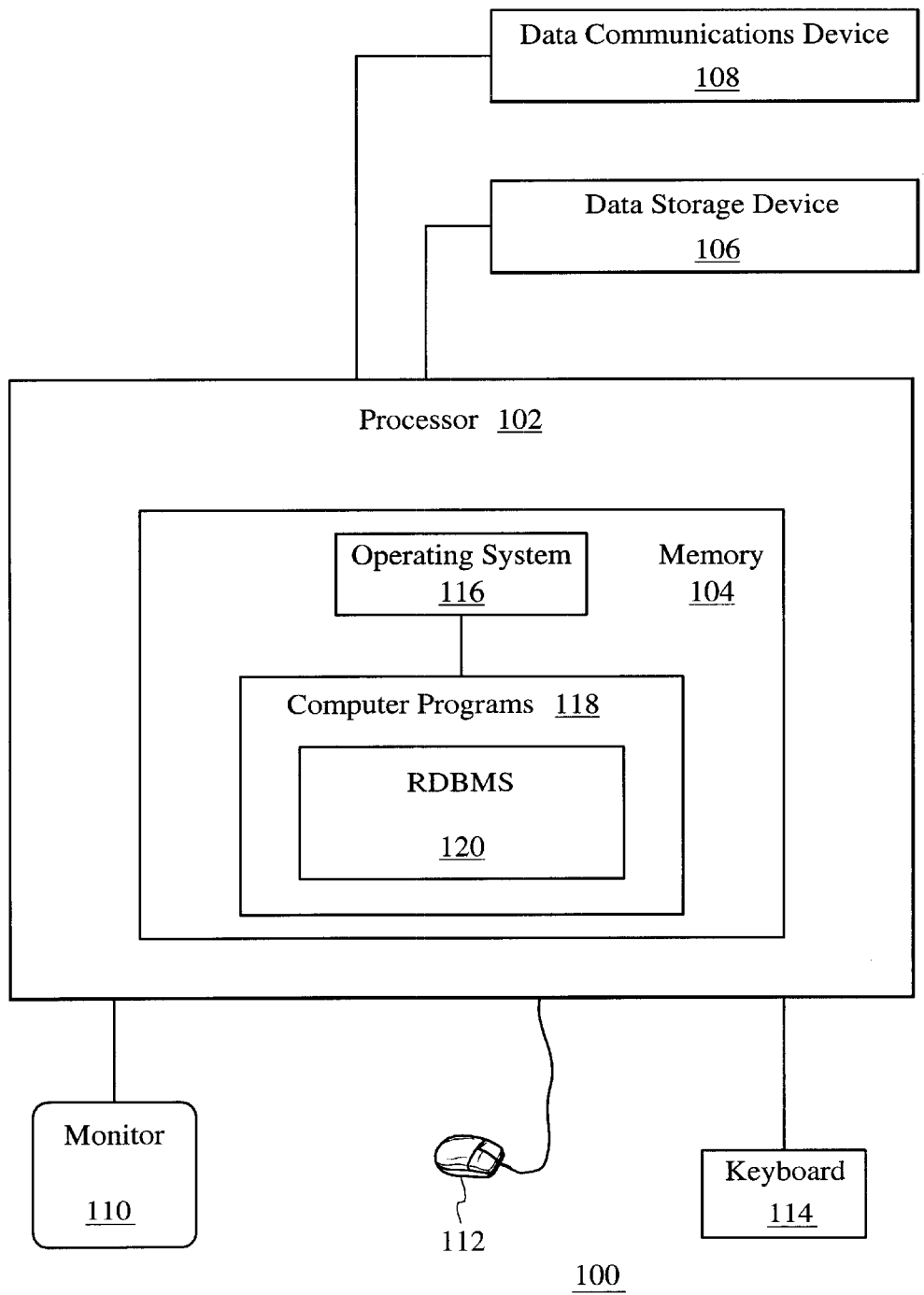
FIG. 2 illustrates a hardware environment used to implement the present invention.

Accordingly, FIG. 2 illustrates a hardware environment used to implement the present invention. As illustrated in FIG. 2, in the preferred embodiment the present invention is implemented in a server computer ("server") 100. The server 100 generally includes, a processor 102, a memory 104 such as a random access memory (RAM), a data storage device 106 (e.g., hard drive, floppy disk drive, CD-ROM disk drive, etc.), a data communication device 108 (e.g., modem, network interface device, etc.), a monitor 110 (e.g., CRT, LCD display, etc.), a pointing device 112 (e.g., a mouse, a track ball, a pad or any other device responsive to touch, etc.) and a keyboard 114. It is envisioned that attached to the computer 100 may be other devices such as read only memory (ROM), a video card drive, printers, peripheral devices including local and wide area network interface devices, etc. One of ordinary skill in the art will recognize that any combination of the above system components may be used to configure the server 100.

The server 100 operates under the control of an operating system ("OS") 116, such as MVS®, AIX®, UNIX®, OS/2®, WINDOWS®, WINDOWS NT®, etc., which typically, is loaded into the memory 104 during the server 100 start-up (boot-up) sequence after power-on or reset. In operation, the OS 116 controls the execution by the server 100 of computer programs 118, including server and/or client-server programs. Alternatively, a system and method in accordance with the present invention may be implemented with any one or all of the computer programs 118 embedded in the OS 116 itself without departing from the scope of the invention. Preferably, however, the client programs are separate from the server programs and are not resident on the server.

The OS 116 and the computer programs 118 each comprise computer readable instructions which, in general, are tangibly embodied in or are readable from a media such as the memory 104, the data storage device 106 and/or the data communications device 108. When executed by the server 100, the instructions cause the server 100 to perform the steps necessary to implement the present invention. Thus, the present invention may be implemented as a method, apparatus, or an article of manufacture (a computer-readable media or device) using programming and/or engineering techniques to produce software, hardware, firmware, or any combination thereof.

The server 100 is typically used as a part of an information search and retrieval system capable of receiving, retrieving and/or dissemination information over the Internet, or any other network environment. One of ordinary skill in the art will recognize that this system may include more than one of server 100.

In the information search and retrieval system, such as a digital library system, a client program communicates with the server 100 by, inter alia, issuing to the server search requests and queries. The server 100 then responds by providing the requested information. The digital library system is typically implemented using a relational database management system software (RDBMS) 120 such as the DB2® by IBM Corporation. The RDBMS 120 receives and responds to search and retrieval requests and termed queries from the client. In the preferred embodiment, the RDBMS 120 is server-resident.

In the digital library system, such as IBM Digital Library™ by IBM Corporation, a library server (such as server 100) performs a library server program ("server program") and an object server (such as server 100) performs a object server program (also "server program"). This dual-server digital library system is typically used as a large-scale information objects search and retrieval system which operates in conjunction with the RDBMS 120. Large-scale information objects ("objects") include a high resolution digital representation of ancient works of authorship and ancient works of art such as those found in the Vatican, as well as movies, classic and modern art collections, books, etc.

The objects themselves are typically stored in a relational database connected to the object server, and the information about the objects is stored in a relational database connected to the library server, wherein the server program(s) operate in conjunction with the RDBMS 120 to first store the objects and then to retrieve the objects. One of ordinary skill in the art will recognize that the foregoing is an exemplary configuration of a system which embodies the present invention, and that other system configurations may be used without departing from the scope and spirit of the present invention.

During execution and communications with client programs, the server programs provide messages akin to the above-mentioned system messages. These messages include error messages, warning messages, information messages and action messages. These messages are provided electronically, on-screen, and information related thereto is provided electronically via the on-line help Web page ("on-line help") or, alternatively, via a printed reference manual book ("book") provided by the manufacturer. The On-line help is typically represented using HTML (Hypertext Markup Language).

Figure 3:
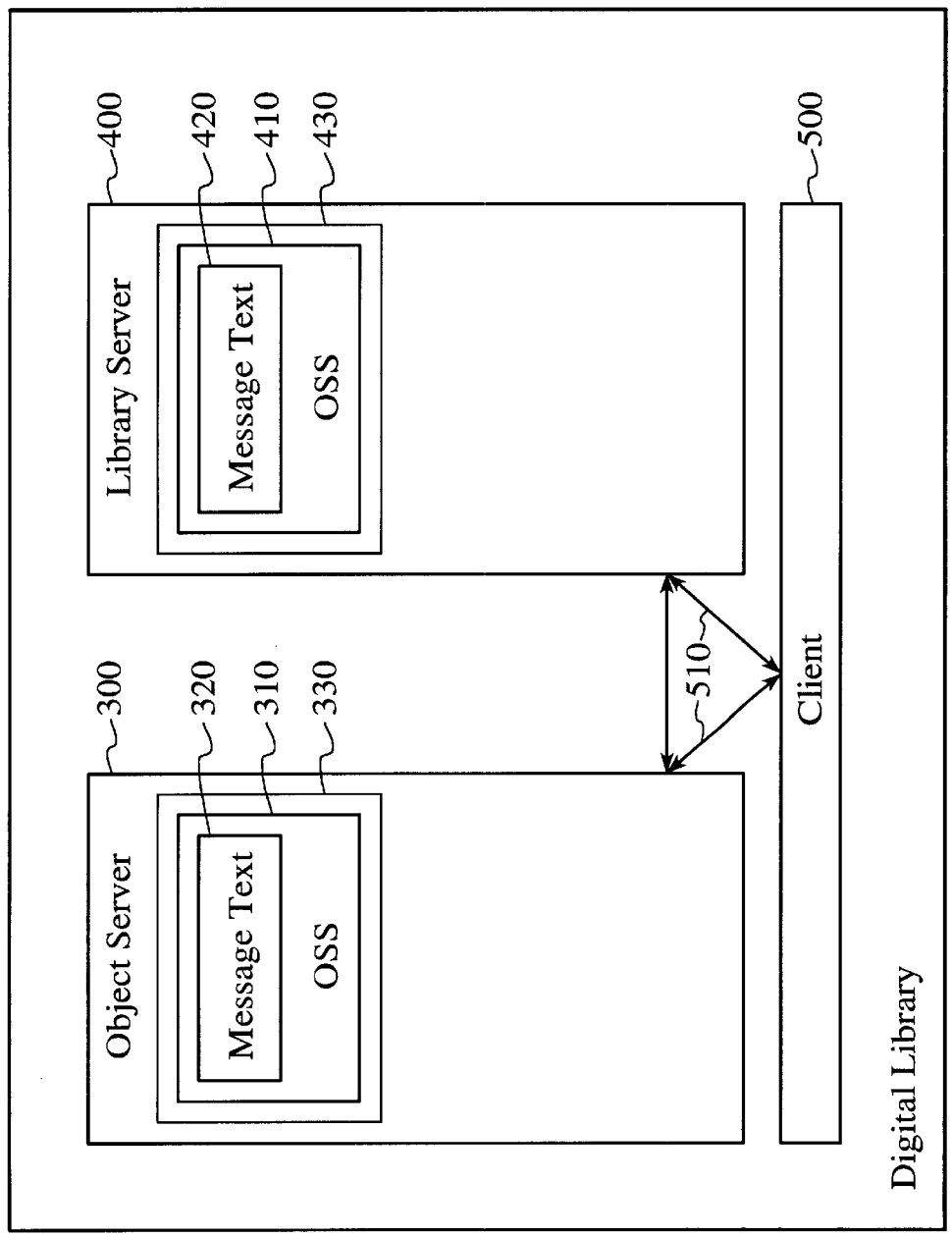
FIG. 3 illustrates an client-server application implementing the present invention.
Figure 4:
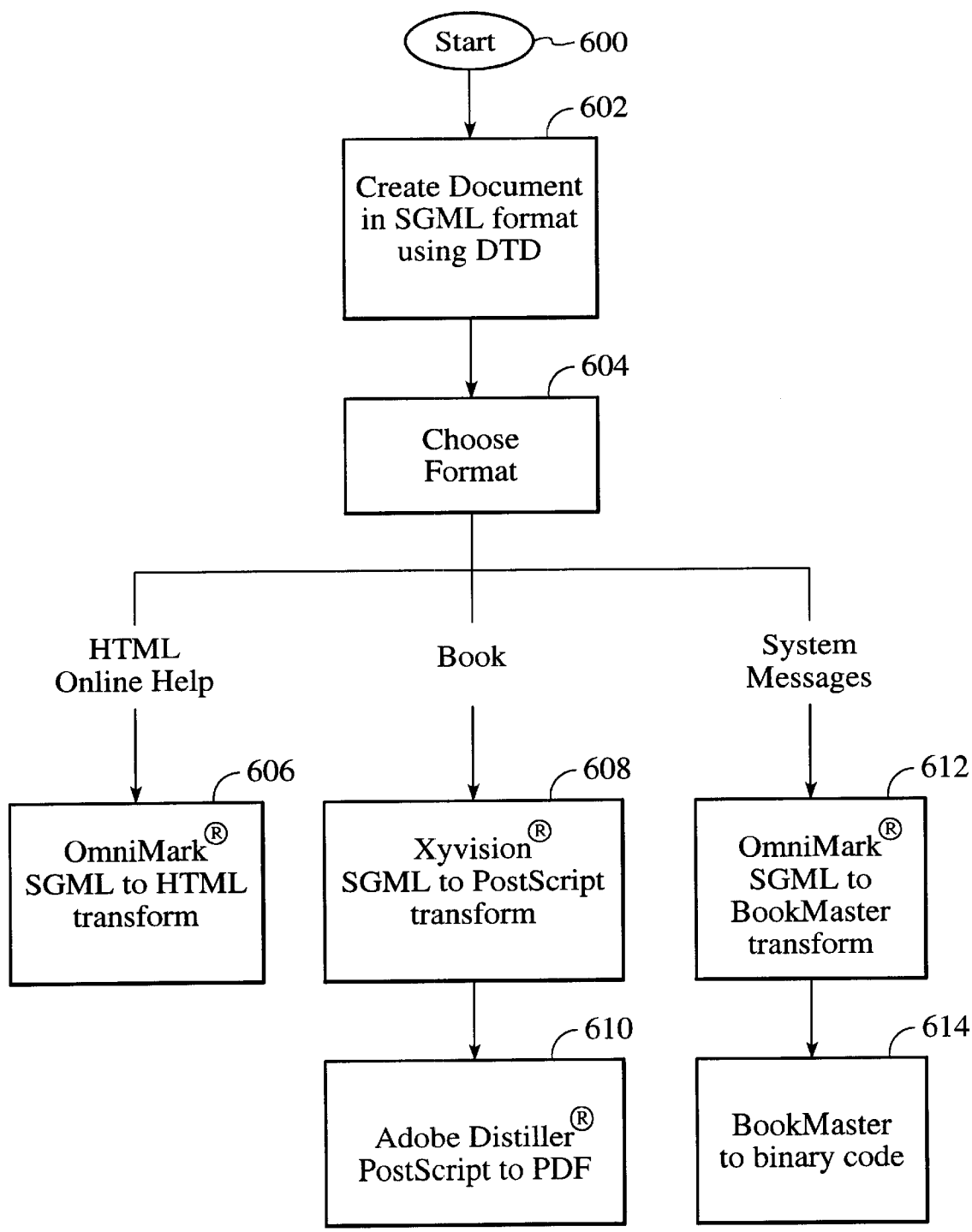
FIG. 4 illustrates an exemplary flow diagram of the present invention.

As set forth in more detail below and as illustrated in FIGS. 3 and 4, a method and system in accordance with the present invention solves the problem of inconsistency between the on-screen system messages, the on-line help and the book. In addition, compatibility of the messages information with any of the operating system platforms is achieved with the method and system in accordance with the present invention so that multiple operating system platform based versions (i.e., messages information source text versions directed to AIX®, OS/2®, WINDOWS NT®, UNIX®, etc.) of each of the server programs need not be produced and maintained.

FIG. 3 illustrates a client-server application implementing the present invention. The exemplary implementation of the present invention is configured as a digital library system 200 comprising an object server 300 and a library server 400. The object server 300 executes an object server program 330 which operates in conjunction with an RDBMS (not shown). Likewise, the library server 400 executes a library server program 430 which operates in conjunction with a corresponding RDBMS (not shown).

Each of the server programs 330 and 430, further includes an Operating System Service ("OSS") 310 and 410, respectively. Each of the OSSs 310 and 410 provides means for interacting with the corresponding operating system for allowing the server programs 330 and 430, respectively, to function as operating system platform independent programs. As stated above, providing for operating system independence is one advantage produced by the present invention.

In accordance with the present invention, each of the OSSs 310 and 410 includes a corresponding binary code formatted version of the system messages. The method by which this binary code formatted version is created is explained herein below in the description accompanying FIG. 4. The incorporation in each of the OSSs 310 and 410 of the corresponding binary code formatted versions enables a selective fetching of the system messages from the OSSs 310 and 410, respectively, by the respective server program 330 and 430 during execution and communications with client programs.

One such client program 500, communicates with the object and library server programs 330 and 430 through a communication link 510. The client program 500, is configured to send information search and retrieval or storage requests. Such requests are handled by the object and library server programs 330 and 430, respectively, using the functionality provided by the corresponding RDBMS.

As indicated, maintaining consistency between the on-screen system messages, the on-line help and the book, via creation of the binary code formatted version as one of the plurality of versions of the common source document, is an important feature of the present invention. To more particularly describe the present invention and illustrate this feature, refer now to FIG. 4 and the accompanying description below.

FIG. 4 illustrates a flow diagram of the present invention. Each new server program is preferably produced with the OSS as an integral part thereof.

Part of this process is dedicated to producing the text for the messages. In the preferred embodiment the original messages information text is produced in a formatted source text file having no specific operating system platform dependency, that is, a version of text that is compatible with any operating system including AIX®, OS/2®, WINDOWS NT®, UNIX®, etc. Alternatively, the source text file has operating system specific text each of which can be conditionally included in any one of the plurality of versions. That is, the source text file is compatible with a plurality of operating systems such as the above enumerated operating systems. This source file is then used to produce the plurality of versions ("documents") of the original messages information text, wherein these documents are consistent with each other. (Operating system platform-specific versions can be produced if need be.)

Accordingly, the process begins via step 600. Then the original messages text is formatted using any Document Type Definition (DTD), via step 602. This formatted text is also referred to as "source code". In the preferred embodiment, the DTD used is the IDDOC® (Information Development Document) by IBM Corporation. Preferably, the resulting source code has a Standard Generalized Markup Language (SGML) format. However, one of ordinary skill in the art will recognize that different embodiments may utilize markup languages other than SGML without departing from the scope and spirit of the present invention.

Each part of the messages information is characterized as a segment to be incorporated in one of the OSS version, the help version and the book version, each of which may be an operating system-specific version. Thus, for example, the OSS version segments may be designated by a "props=OSS" control being asserted, the help version segments may be designated by a "props=help" control being asserted, and the book version segments may be designated by both the props=OSS and props=help controls being asserted. A particular version of the source code may be created by filtering out the other version-specific segments and leaving in the particular version-specific segments thereof. Additionally, a particular operating system-specific version of the source code may be created by filtering out the other operating system specific segments and leaving in the particular operating system specific segments thereof.

Moreover, the SGML formatted source code is converted into the other formatted versions including the HTML, the postscript and the binary code, one process leg at a time. Thus, a decision is made choosing which one of the formatted versions to create next, via step 604. Once this decision has been made, the corresponding process leg is traversed. It should be understood that formatted versions may be created with operating system-specific text, so the decision may include selecting the proper operating system. The text specific to the proper operating system will be included therefore in the formatted version of the source code.

Accordingly, if a decision to produce an on-line help document has been made, via step 604, a transform such as the OmniMark®, an industry standard transform, is used for converting the SGML formatted source code to the HTML formatted on-line help version of the source code, via step 606. One of ordinary skill in the art will recognize that different embodiments may utilize different transforms commensurate with the source code and the resulting formatted version thereof if formats other than SGML and/or HTML are being used.

Alternatively, a different leg of the process is traversed if a decision has been made, via step 604, to produce a Postscript formatted version and/or a PDF (Portable Document Format) version of the SGML formatted source code, i.e., the book version. In this case, a transform such as the Xyvision®, an industry standard transform, is used for converting the SGML formatted source code to the Postscript formatted version thereof, via step 608. A hard (printed) copy can then be produced from the Postscript formatted version of the source code. A soft copy thereof can also be produced by converting the Postscript formatted version into the PDF formatted version using, for example, the Adobe Distiller® transform, via step 610.

In a further alternative, if a decision has been made, via step 604, to produce the binary code formatted version of the source code for providing the on-screen system messages, a transform such as the OmniMark® is used to convert the SGML formatted source code to a BookMaster® formatted version thereof, via step 612. Then, an additional transform, such as a transform developed as part of the DB2® software package by IBM Corporation, is used to convert the resulting BookMaster® formatted version into the binary code formatted version of the source code, via step 614.

One of ordinary skill in the art will recognize that, alternatively, without departing from the scope of the invention, any intermediate formatted version may be used in the process of converting the SGML (or other) formatted source code into the binary code formatted version thereof, so long as the proper transform is used in conjunction with this format and so long as the resulting binary code formatted version represents a version of the system messages that is consistent with all the other formatted versions thereof. In addition, one of ordinary skill in the art will recognize that, the conversion from the SGML (or other) formatted source code to the binary code formatted version thereof may be performed in a single step instead of two. This alternative approach is within the scope and spirit of the invention.

An advantage of the present invention is that once this binary code formatted version of the source code is created, a binary file containing it can be embedded in (i.e., linked with) the OSS software which, as explained above, is preferably integral to the respective server programs. As a result, the OSS contains, in effect, a binary formatted version of the system messages for on-screen display which is consistent with the on-line help and the book versions.

Accordingly, in operation, the server programs issue messages by calling the OSS which uses, for example, the message identifiers sent by the respective server program to selectively retrieve the proper messages from the binary file containing it. The OSS then logs these messages to a display for the user to see. The system messages retrieved by the OSS are, thereby, consistent with the messages information presented in the on-line help and the book. Furthermore, by reason of incorporating into the OSS the operating system independent binary code formatted version of the source code, the OSS and, in turn, the server programs are compatible with any operating system platform.

A method and system have been disclosed for using a document type definition and a document transform to convert a source document which is operating system platform independent into a plurality of documents, wherein the plurality of documents have a format and at least one of them has a binary code format.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for converting a source document into a plurality of documents, each document being defined by a corresponding version, wherein the source document contains information about all of the versions of the plurality of documents, each of the plurality of documents having one of a plurality of formats, the method comprising the steps of:

a) providing a document type definition (DTD) for formatting the source document; and b) providing a plurality of transforms to convert the source document into the plurality of documents, each of the plurality of documents being created by filtering out all the versions except the corresponding version, wherein at least one of the plurality of documents is a Hypertext Markup Language (HTML) formatted version for on-line help, at least one of the plurality of documents is a printable book in a postscript format, and at least one of the plurality of documents is a binary code formatted version for system messages, wherein the binary code formatted version is embedded in an Operating System Service (OSS), and whereby the plurality of documents are consistent with each other.

2. The method of claim 1, wherein the source document and the plurality of documents are operating system independent.

3. The method of claim 2, wherein a source document format resulting from the formatting step (a) includes an standard generalized markup language (SGML) format.

4. The method of claim 2, wherein the DTD includes an Information Development Document (IDDOC®) workbench.

5. The method of claim 2, wherein the source document is compatible with a plurality of any operating systems.

6. The method of claim 3, wherein the plurality of documents are compatible with one of a plurality of operating systems.

7. The method of claim 2, wherein at least one of the transforms converts the source document into a softcopy book including in a Page Description Format (PDF) version.

8. The method of claim 2, wherein the at least one of the transforms comprises an OmniMark transform.

9. The method of claim 2, wherein the at least one of the transforms comprises a Xyvision transform.

10. The method of claim 1, wherein the OSS is incorporated in a server program.

11. The method of claim 1, wherein the OSS is incorporated in a client program.

12. The method of claim 11, wherein the client program is connected to a server-resident program.

13. A method for converting a source document into a plurality of documents, each document being defined by a corresponding version, wherein the source document contains information about all of the versions of the plurality of documents, each of the plurality of documents having one of a plurality of formats, the method comprising the steps of:

a) providing a document type definition (DTD) for formatting the source document; and b) providing a plurality of transforms to convert the source document into the plurality of documents, each of the plurality of documents being created by filtering out all the versions except the corresponding version, wherein at least one of the plurality of documents is a Hypertext Markup Language (HTML) formatted version for on-line help, at least one of the plurality of documents is a printable book in a postscript format, and at least one of the plurality of documents is a binary code formatted version for system messages, wherein the binary code formatted version is incorporated in a server program, and whereby the plurality of documents are consistent with each other.

14. The method of claim 13, wherein a client program is incorporated in a server-resident program.

15. A system for converting a source document into a plurality of documents, each document being defined by a corresponding version, wherein the source document contains information about all of the versions of the plurality of documents, each of the plurality of documents having one of a plurality of formats, the system comprising:

means for providing a DTD for formatting the source document;

means for providing a plurality of transforms for converting the source document into the plurality of documents, each of the plurality of documents being created by filtering out all the versions except the corresponding version, wherein at least one of the plurality of documents is a Hypertext Markup Language (HTML) formatted version for on-line help, at least one of the plurality of documents is a printable book in a postscript format, and at least one of the plurality of documents is a binary code formatted version for system messages, whereby the plurality of documents are consistent with each other; and at least one computer, the at least one computer functioning as a server executing a server program, the server program including an Operating System Service (OSS) for making the server program compatible with the operating system, wherein the at least one binary code formatted version of the source document is embedded in the OSS.

16. The system of claim 15, wherein the source document and the plurality of documents are operating system independent.

17. The system of claim 15, wherein the system further comprises a plurality of computers, and wherein the at least one computer is capable of communicating with at least one other computer from among the plurality of computers.

18. The system of claim 15, wherein a client program is not resident in the server.

19. The system of claim 15, wherein the server program comprises a client program.

20. A computer readable medium comprising program instructions for converting a source document into a plurality of documents, each document being defined by a corresponding version, wherein the source document contains information about all of the versions of the plurality of documents, each of the plurality of documents having one of a plurality of formats, the program instructions for:

providing a document type definition (DTD) for formatting the source document;

providing a plurality of transforms to convert the source document into the plurality of documents, each of the plurality of documents being created by filtering out all the versions except the corresponding version, wherein at least one of the plurality of documents is a Hypertext Markup Language (HTML) formatted version for on-line help, at least one of the plurality of documents is a printable book in a postscript format, and at least one of the plurality of documents is a binary code formatted version for system messages, whereby the plurality of documents are consistent with each other; and providing an Operating System Service (OSS) for making a server program compatible with an operating system, wherein the at least one binary code formatted document is embedded in the OSS.

21. The computer readable medium of claim 20, wherein the source document and the plurality of documents are operating system independent.

22. The method of claim 1 wherein a particular version of the source document is created by filtering out other version-specific segments and leaving in particular version-specific segments thereof.

23. The method of claim 1 wherein a particular operating system-specific version of the source document is created by filtering out other operating system-specific segments and leaving in particular operating system segments thereof.

24. The system of claim 1 wherein a particular version of the source document is created by filtering out other version-specific segments and leaving in particular version-specific segments thereof.

25. The system of claim 15 wherein a particular operating system-specific version of the source document is created by filtering out other operating system-specific segments and leaving in particular operating system segments thereof.

26. The computer readable medium of claim 20 wherein a particular version of the source document is created by filtering out other version-specific segments and leaving in particular version-specific segments thereof.

27. The computer readable medium of claim 20 wherein a particular operating system-specific version of the source document is created by filtering out other operating system-specific segments and leaving in particular operating system segments thereof.

28. A method for converting a source document into a plurality of documents, each of the plurality of documents having one of a plurality of formats, the method comprising the steps of:
   a) providing a document type definition (DTD) for formatting the source document; and
   b) providing a transform to convert the source document into the plurality of documents, wherein the source document and the plurality of documents are operating system independent, wherein the transform comprises a plurality of transforms, wherein at least one of the transforms converts the source document into an on-line help including a Hypertext Markup Language (HTML) format version, wherein at least one of the transforms converts the source document into a printable book including a postscript format version, wherein at least one of the transforms converts the source document into a softcopy book including a Page Description Format (PDF) version, at least one of the plurality of documents having a binary code format, wherein at least one of the transforms converts the source document into the binary code format version thereof, wherein the binary code formatted version is embedded in an Operating System Service (OSS).

* * * * *

UNITED STATES PATENT AND TRADEMARK OFFICE
CERTIFICATE OF CORRECTION

PATENT NO. : 6,393,442 B1
DATED : May 21, 2002
INVENTOR(S) : Valerie C. Cromarty and Joni L. Gordon It is certified that error appears in the above-identified patent and that said Letters Patent is hereby corrected as shown below:

<u>Title page, Item [54] and Column 1, line 1,</u>
Title should read: -- DOCUMENT FORMAT TRANSFORMATIONS FOR CONVERTING PLURALITY OF DOCUMENTS WHICH ARE CONSISTENT WITH EACH OTHER --

<u>Column 6,</u>
Line 51, "each" should read -- all --

Signed and Sealed this

Eighth Day of October, 2002

*Attest:*

*Attesting Officer*

JAMES E. ROGAN
*Director of the United States Patent and Trademark Office*